(12) United States Patent  (10) Patent No.: US 8,019,182 B1
Wolfram et al.  (45) Date of Patent: Sep. 13, 2011

(54) DIGITAL IMAGE MODIFICATION USING PYRAMID VIGNETTES

(75) Inventors: Herbert Wolfram, San Rafael, CA (US); Bob Van Manen, Happy Valley, OR (US)

(73) Assignee: Adobe Systems Incorporated, San Jose, CA (US)

( * ) Notice: Subject to any disclaimer, the term of this patent is extended or adjusted under 35 U.S.C. 154(b) by 1019 days.

(21) Appl. No.: 11/841,460

(22) Filed: Aug. 20, 2007

(51) Int. Cl.
G06K 9/32 (2006.01)
G06K 9/62 (2006.01)
G06K 9/64 (2006.01)
G06K 9/68 (2006.01)
G09G 5/02 (2006.01)
H04N 1/405 (2006.01)

(52) U.S. Cl. ........ 382/299; 382/209; 382/217; 382/221; 345/698; 358/3.1

(58) Field of Classification Search .................. 382/209, 382/217–222, 299
See application file for complete search history.

(56) References Cited

U.S. PATENT DOCUMENTS

| | | |
|---|---|---|
| 4,007,487 A | 2/1977 | Vlahos |
| 5,325,449 A | 6/1994 | Burt et al. |
| 5,488,674 A | 1/1996 | Burt et al. |
| 5,537,228 A | 7/1996 | Dillinger |
| 5,793,374 A | 8/1998 | Guenter et al. |
| 6,593,925 B1 | 7/2003 | Hakura et al. |
| 6,904,360 B2 * | 6/2005 | Pechatnikov et al. ......... 701/208 |
| 6,944,327 B1 * | 9/2005 | Soatto ........................ 382/154 |
| 7,081,898 B2 | 7/2006 | Sevigny |
| 7,277,572 B2 * | 10/2007 | MacInnes et al. ............ 382/154 |
| 7,315,630 B2 | 1/2008 | Steinberg et al. |
| 7,548,238 B2 | 6/2009 | Berteig et al. |
| 7,657,341 B2 * | 2/2010 | Lind .......................... 700/141 |
| 7,689,035 B2 | 3/2010 | Mallick et al. |

OTHER PUBLICATIONS

E.H. Adelson, C.H. Anderson, J.R. Bergen, P.J Burt, and J.M. Ogden, "Pyramid methods in image processing," Nov./Dec. 1984; *RCA Engineer*.

* cited by examiner

*Primary Examiner* — Brian Q Le
*Assistant Examiner* — Jose M Torres
(74) *Attorney, Agent, or Firm* — Fish & Richardson P.C.

(57) ABSTRACT

The present disclosure includes systems and methods relating to digital image modification using pyramid vignettes. In general, one aspect of the subject matter described in this specification can be embodied in a method that includes receiving a request associated with rendering a photorealistic variation of a master digital image at an original resolution, selecting a digital image template from a number of digital image templates comprising image data associated with the master digital image at various resolutions, the selected image data at a different resolution from the original resolution, and rendering the photorealistic variation of the master digital image using the selected template.

28 Claims, 5 Drawing Sheets

DIGITAL IMAGE MODIFICATION USING PYRAMID VIGNETTES

BACKGROUND

The present disclosure relates to digital image modification. A digital image can originate from an input device, such as a digital camera or a digital scanner. A digital image can also be synthesized using mathematical functions or geometric models. Once captured or created, a digital image can be modified electronically to produce a number of variations of the image.

An image can be represented electronically as a grid of information units known as pixels. Each pixel contains color, brightness, and other information about a single point in the image. The greater the number of pixels used to represent an image, the higher the resolution of the image and generally the more realistic the image appears to a human observer. An image can be modified by changing the information contained in a pixel or group of pixels. The number of pixels can also be increased through extrapolation to produce a higher-resolution image or can be decreased through merging to produce a lower-resolution image. The sophistication of the image modification process and the level of detail in the original image can affect the quality of a modified digital image.

Human visual perception is extremely complex and relies on many subtle visual and contextual cues to interpret an image. Digital photography typically captures a scene with sufficient nuance and detail to produce a digital image that appears realistic to a human observer. Digital images that capture or synthesize a scene with sufficient nuance and detail to appear realistic to a human observer are said to be "photo-realistic."

SUMMARY

This specification describes technologies relating generally to digital image modification, and more specifically to digital image modification using pyramid vignettes. In general, one aspect of the subject matter described in this specification can be embodied in a method that includes receiving a request associated with rendering a photorealistic variation of a master digital image at an original resolution, selecting a digital image template from a number of digital image templates comprising image data associated with the master digital image at various resolutions, the selected image data at a different resolution from the original resolution, and rendering the photorealistic variation of the master digital image using the selected template. Other embodiments of this aspect include corresponding systems, apparatus, and computer program products.

These and other embodiments can optionally include one or more of the following features. Additional scaling may be performed on the rendered digital image. The rendered digital image may be provided to the requestor or to another entity. The image may be rendered by selecting color data associated with the request and combining selected color data with selected image data. The photorealistic variation may be a color change or a texture change to the master digital image. The selected resolution may be equal to or greater than the requested resolution. A single file, data structure, or other reference entity may contain all of the templates. Successive templates may represent the data at half the resolution of the previous template. Texture maps and illumination data may be contained in the image data. The rendering may be performed on server in communication with a client and the request may be received from the client. The client may be an image viewer.

Particular embodiments of the subject matter described in this specification can be implemented to realize one or more of the following advantages. Requests to render a photorealistic variation of an original master digital image at a resolution different from the original resolution may be fulfilled faster using fewer processing resources and/or fewer storage resources. By selecting pre-scaled data for use in the rendering process, rendering of unnecessary pixels may be avoided. Using pre-scaled data may also result in higher quality rendered images, at least because the scaling algorithms used prior to rendering are not subject to the same time constraints present at rendering time. Photorealistic variations of an original master digital image may be rendered for an image with subtle lighting variations, such as an image of an apparel model. A single illumination map of a master digital image may be used to render multiple complex variations, such as re-texturing an apparel item. Alternate textures and finishes may be applied to objects in a master digital image, eliminating the need for additional authoring of the image and also eliminating the need to produce additional images, for example, through photography. Heuristically based adjustments during the rendering process may provide for more realistic rendered images than mathematical models alone. Lossless image compression may be achieved, and management of image content, for example, management of image content on a web site, may be performed more efficiently.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Retailers, service providers, and other business entities generally seek to advertise their products and services. One method of advertising is to provide images of products and services to potential consumers. For example, if a potential consumer visits the web site of a clothing retailer, the consumer may be presented with a variety of images of dresses, suits, shoes, and other apparel items that the retailer is offering for sale. As another example, if a potential consumer visits the web site of a home furnishings retailer, the consumer may be presented with a variety of images of draperies, upholstered chairs and sofas, or other soft furnishings that the retailer is offering for sale. Some of these web sites may provide the consumer with a rich media experience, allowing the consumer to select an image for display, zoom in on a particular area of the image, rotate the image, or perform any number of other actions related to the image. For example, the consumer may select a particular item of clothing, such as a suit, by double-clicking a thumbnail image of a model wearing the suit. As a result of selecting the thumbnail image, a larger image of the model wearing the suit may be displayed. The consumer may be able to rotate the image to see the suit from a different angle, zoom in to see the fabric details of the suit, select a different fabric or color, or perform other manipulations of the suit image.

Typically, a retailer will offer several variations of a particular product. For example, a particular style of suit may be available in several different colors and fabrics. Rather than photograph each variation of the suit individually, a single original digital photograph of the suit may be electronically altered multiple times to simulate the variations. To produce the image variations, the original digital photograph may first be authored, and the authored image may then be rendered for each variation. During the image authoring process, information about the original digital image is collected and/or generated to produce a digital image template stored in an image vignette. During the image rendering process, information stored in a digital image template from an image vignette forms a basis from which to synthesize a variation of the digital image. Once a master digital image is authored and an image vignette is produced, a number of variations of the single master digital image may be rendered from the image vignette.

The image authoring process begins with a master digital image. The master image is imported into an authoring application running on a local workstation or accessed through a portal to an external processor such as an application server. One or more data items associated with renderable objects may then be created from the master image. For example, masks may be created by designating particular areas of the image, such as a shirt area, a sleeve area, a collar area, etc., as selectable for coloring or texturing during the rendering process. An illumination map may be created by extracting illumination data from the master image to produce a gray-scale image detailing the highlights and shadows present in the original image. The extraction of the illumination data may involve a normalization process to ensure that subsequent coloring, texturing, or similar processing gives equally good results for light and dark colors. An illumination map describes items present in the image as if it they were spray painted with a solid, neutral gray color of approximately 50% density. In other words, the information in an illumination map describes the effects caused by light falling on objects represented in the image regardless of the particular color of the objects. In some implementations, creation of the masks, illumination maps, and other data items associated with renderable objects is an interactive process in which a user views the master digital image and uses an input device such as a mouse to control the process. In some implementations, all or part of the authoring process is performed by the authoring application without user input.

Meshes may also be created during the authoring process. A mesh provides a three-dimensional model of an individual mask area that captures non-planar features such as curves, folds, wrinkles and other topographical features of the area to ensure that textures applied during the rendering process are warped or deformed to appear natural and realistic. A mesh may then be flattened (i.e., represented as two-dimensional) to form a UV map, also known as a texture map, which is a look-up table (LUT) containing coordinates for each pixel in the master image. The UV coordinates represent the projection of the three-dimensional model onto a two-dimensional surface.

Together with the master image, the masks, models, maps, and other data items associated with renderable objects produced by an image authoring process form a digital image template that can be used as a basis from which to synthesize variations of the master image. A digital image template produced by an image authoring process is stored in an image vignette. Once a master digital image is authored and an image vignette is produced, a number of variations of the single master digital image may be rendered from the vignette.

The image rendering process may consist of a number of distinct operations performed in sequence. The process takes the form of a tree structure with output from earlier operations forming the input to later ones, with a single final operation producing the fully rendered image. Together, these operations form a render pipeline, also referred to as a graphics pipeline or a pixel pipeline. Each individual rendering operation may be performed within its own application or groups of operations may be performed within a single application. In some implementations, the rendering process is included in an interactive image authoring application, allowing a user to inspect rendered images as part of the authoring process. In some implementations, the rendering process is performed as an independent application running on a local workstation or on an external processor such as an application server.

The rendering process begins with a request for a rendered image based on a master image. The request specifies the particular modifications that should be made to the appearance of items in the master image. For example, the request may specify a master image of a black car, but the car should be shaded silver instead of black. A rendering application may then access data items associated with renderable objects from an image vignette previously generated from the master image of the black car, and may apply an appropriate set of render parameters. Render parameters determine how the requested image appearance modifications, such as color modifications and texture modifications, should be combined with the data items associated with renderable objects to produce the rendered image. For the car image example, mask data from the image vignette may be used to determine which pixels will be modified, render parameters associated with the rendering application may be used to determine how the requested silver color should be combined with the illumination data from the image vignette in the modified pixels, and original image data from the image vignette may be used for the pixels which are not modified.

Figure 1:
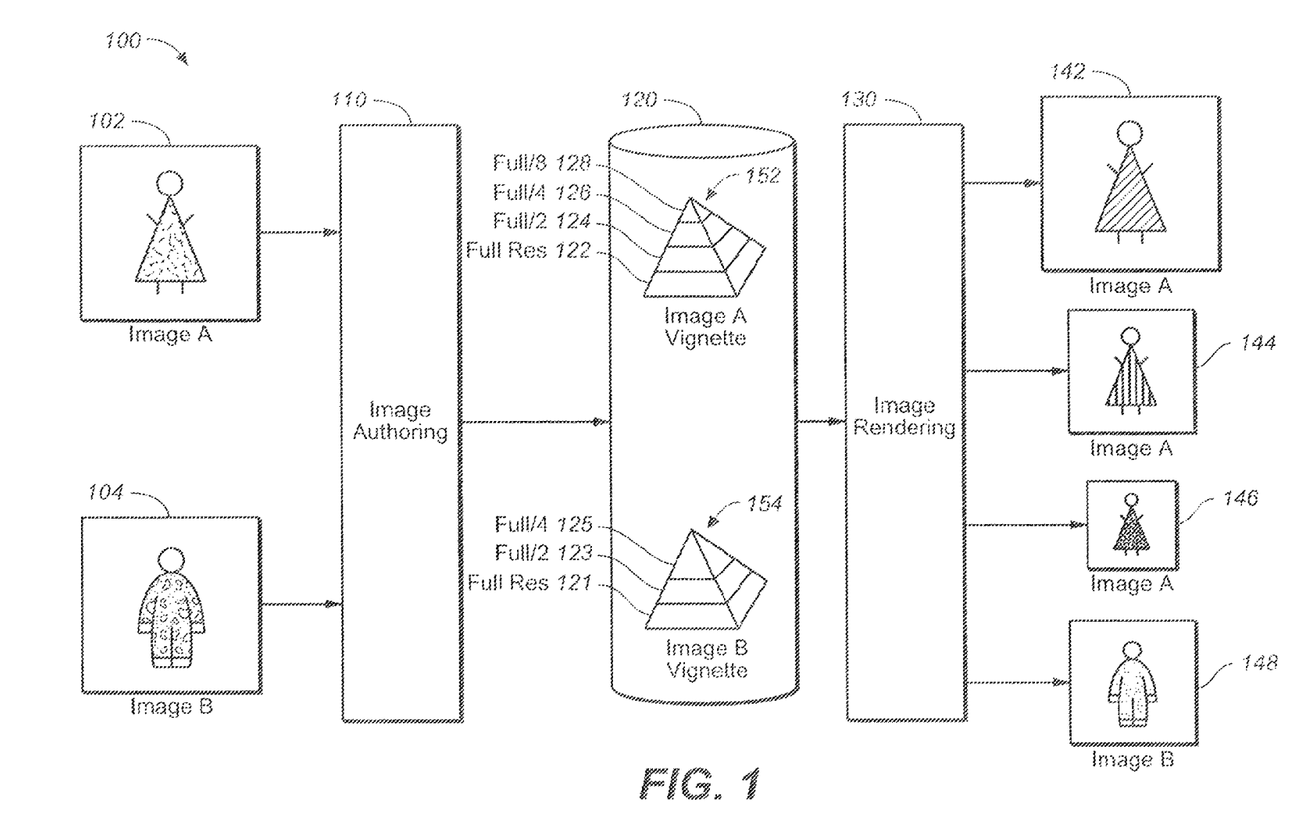
FIG. 1 is an example system for authoring digital images and rendering photorealistic variations of the digital images.

An example system 100 for authoring digital images and rendering photorealistic variations of the digital images is shown in FIG. 1. Image A 102 and image B 104 represent previously captured digital photographic images that are input to image authoring process 110 as master images. Image authoring process 110 may be part of a software application configured to run on a computer or other data processing apparatus. In some implementations, image authoring process 110 is a workstation-based software application. Image authoring process 110 may create image A vignette 152 from master image A 102 and may create image B vignette 154 from master image B 104. Image authoring process 110 may be automated such that master images 102 and 104 are authored and image vignettes 152 and 154 are produced according to a rule set within image authoring process 110. In some implementations, image authoring process 110 is a supervised process in which a user is interactively involved, and provides a user interface enabling a user to exercise control over some or all of the authoring process. For example, a user may be able to view the master image and use an input device, such as a mouse, to designate a portion of the image as a mask area.

Information stored in image A vignette 152 may be used by image rendering process 130 to generate a number of photorealistic variations of master image A 102, and information stored in image B vignette 154 may be used by image rendering process 130 to generate a number of photorealistic variations of master image B 104. For example, the model in master image A 102 may have been digitally photographed wearing a particular style of smooth-textured blue cotton dress. The resulting vignette 152 may be used by image rendering process 130 to generate a photorealistic image 142 of the model appearing to wear a coarse-textured green linen dress of the same style. Image 142 may be rendered with sufficient nuance and detail to appear to a human observer as if the model were originally photographed wearing the coarse-textured green linen dress.

The information stored in vignettes 152 and 154 may vary depending on the complexity and sophistication of image authoring process 110, and may include mask data that define one or more regions of the master image that can be replaced or modified, illumination maps that capture the naturally occurring shadows and highlights in the masked regions of the master image, data models that capture the topography of the masked regions of the master image, and master image data for regions of the image that are not replaced or modified as a result of image rendering process 130. This information forms a digital image template that can be used as a basis from which to synthesize variations of the master images 102 and 104. When image authoring process 110 is performed on a master image at full original resolution, a digital image template is created at the same full original resolution. Images rendered using this digital image template will be of the same resolution as the master image.

In some cases, it may be desirable to synthesize a variation of a master image at a resolution other than the original full resolution of the master image. For example, one page of a retailer's web site may display several small preview images of a particular suit in a multitude of colors and fabric textures, and may only display a larger, full resolution image when a preview image is selected by an online shopper. If the image vignette contains only the full resolution digital image template, then the preview images must be rendered at full resolution and then scaled back to the desired resolution. To minimize processor and memory resources associated with such full resolution rendering and subsequent scaling, multiple digital image templates at varying resolutions may be maintained in a pyramid vignette.

In example system 100, image A vignette 152 and image B vignette 154 contain multiple digital image templates at varying resolutions for digital image A 102 and digital image B 104, respectively. Image A vignette 152 contains four digital image templates: template 122 at full resolution, template 124 at one-half of full resolution, template 126 at one-fourth of full resolution, and template 128 at one-eighth of full resolution. Image B vignette 154 contains three digital image templates: template 121 at full resolution, template 123 at one-half of full resolution, and template 125 at one-fourth of full resolution.

In some implementations, full resolution template 122 is created when digital image A 102 is authored at its original resolution and full resolution template 121 is created when digital image B 104 is authored at its full original resolution. Image authoring process 110 may produce digital image templates at greater than or less than full resolution by scaling the master digital image prior to producing the masks, models, maps, and other data items associated with renderable objects associated with the master digital image, by scaling the produced data items, or by a combination of these methods. Additional authoring may then be performed after scaling to produce higher quality data items. In some implementations, digital image templates 121, 122, 123, 124, 125, 126, and 128 each contain a fully autonomous set of data items associated with renderable objects. In other implementations, digital image templates 124, 126, and 128 are dependent on data contained in full resolution template 122, and digital image templates 123 and 125 are dependent on data contained in full resolution template 121. Dependent templates may, for example, contain masks indicating which pixels in the full resolution template should be used for rendering at the lower resolution.

In some implementations, a full resolution template is created from an existing master vignette rather than directly from a master image. In this process, the master vignette may first be scaled to create a full resolution template at a different resolution than the master vignette. A full resolution view may then be created, followed by a series of smaller resolution views. In some implementations, each view in the series is a factor of two smaller than the previous view, and the last view in the series is created when a view fits inside a 128×128 pixel square. Masks, models, maps, and other data items associated with renderable objects from the master vignette may then be scaled or calculated for each resolution in the series.

After creating pyramid image vignettes 152 and 154, image authoring process 110 may store them in data storage device 120, making them available to image rendering process 130. In some implementations, the pyramid vignettes are stored in a single reference entity, such as a data structure or a file. In other implementations, the pyramid vignettes are stored in multiple reference entities. Data storage device 120 may be volatile memory such as RAM, nonvolatile memory such as magnetic or optical disk, or any other suitable storage device. In some implementations, data storage device 120 is a remote storage device such as a data server. Image rendering process 130 may be part of a software application configured to run on a computer or other data processing apparatus. In some implementations, image rendering process 130 is a server-based software application.

Image rendering process 130 may render images at various resolutions by accessing data items from image vignette 152 or 154 and applying render parameters that control how the appearance modifications, such as color modifications and texture modifications, should be combined with the data items to produce the rendered image. Image rendering process 130 may be part of a software application configured to run on a computer or other data processing apparatus. In some implementations, image rendering process 130 is a server-based software application. Image rendering process 130 may access objects from the digital image template contained in the pyramid vignette closest to the target resolution to avoid rendering at unnecessarily high resolutions, which consumes unnecessary resources. To generate image 142, a photorealistic full resolution variation of master image 102, the full resolution digital image template 122 may be accessed by image rendering process 130. To generate image 144, a photorealistic one-half resolution variation of master image 102, the one-half resolution digital image template 124 may be accessed by image rendering process 130. To generate image 146, a photorealistic one-fifth resolution variation of master image 102, the one-fourth resolution digital image template 126 may be accessed by image rendering process 130, and the intermediate one-fourth resolution rendered image appropriately scaled to produce the one-fifth resolution image. To generate image 148, a photorealistic two-thirds resolution variation of master image 104, the full resolution digital image template 121 may be accessed by image rendering process 130, and the intermediate full resolution rendered image appropriately scaled to produce the two-thirds resolution image. Rendered images may be cached for future use. Multiple resolutions of a rendered image may be cached in pyramid form.

Figure 2:
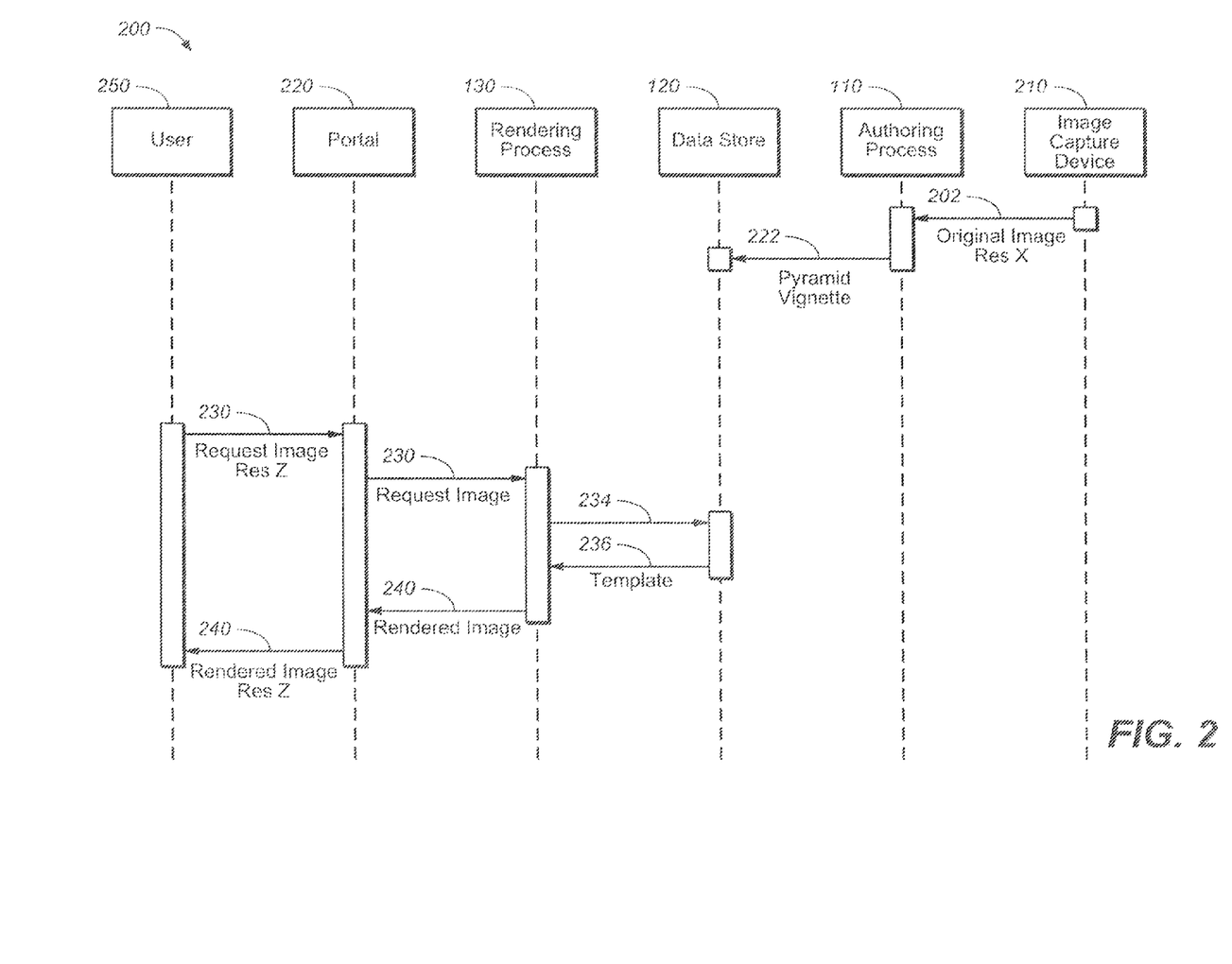
FIG. 2 is a sequence diagram illustrating an example process for authoring a master digital image and rendering a photorealistic variation of the master digital image.

FIG. 2 is a sequence diagram illustrating an example process 200 for authoring a master digital image and rendering a photorealistic variation of the master digital image. Image capture device 210 provides 202 an original digital image to authoring process 110. The original digital image may be, for example, a digital photographic image at resolution X of a person modeling a particular style of gray wool suit. Within authoring process 110, sets of data items associated with renderable objects forming digital image templates are generated at various resolutions to form a pyramid vignette. The sets of data items generated by authoring process 110 may include mask data that define one or more regions of the master image that can be replaced or modified, illumination maps that capture the naturally occurring shadows and highlights in the masked regions of the master image, data models that capture the topography of the masked regions of the master image, and master image data. In some implementations, a digital image template is generated at resolution X, a digital image template is generated at one-half resolution X, and any additional digital image templates are each generated at one-half the resolution of the previous template, forming a pyramid vignette with a factor of two between each resolution. The pyramid vignette is then stored 222 in data store 120.

User 250 initiates a request 230 for a variation of the original image at resolution Z through portal 220 to rendering process 130. For example, user 250 may request a photorealistic rendered image of the model wearing the same style of suit in blue pinstriped cotton instead of gray wool. In some implementations, user 250 is an image viewer application in communication with rendering process 130. In other implementations, user 250 is a person manipulating digital images using rendering process 130, for example, in conjunction with configuring render parameters. Portal 220 may be any device, process, or system operable to communicate the request to rendering process 130. In some implementations, portal 220 is a web portal configured to facilitate communications between a client and a remote server. In other implementations, portal 220 is a user interface configured to provide user input and to receive output from rendering process 130. Rendering process 130 receives request 230 and selects 234, 236 a digital image template from among the digital image templates contained in the pyramid vignette previously stored in data store 120. In some implementations, rendering process 130 selects the digital image template at the resolution closest to, but not less than, resolution Z.

After selecting a digital image template, rendering process 130 accesses the data items in the selected digital image template, combines the data items with color data, and renders the image. Color data is the data representing the requested variation. In the suit example above, color data is the data required to render the suit as a blue pinstriped suit instead of the gray wool in the original image. If the resolution of the selected digital image template is not equal to the requested resolution Z, rendering process 130 may scale the rendered image to resolution Z and provide 240 the scaled rendered image to user 250 through portal 220. In some implementations, if the resolution of the selected digital image template is not equal to the requested resolution Z, rendering process 130 may provide 240 the unscaled rendered image to user 250 through portal 220, and an application at user 250, such as an image viewer application, may scale the rendered image.

In some implementations not illustrated in example process 200, rendered images are cached. Future requests for the rendered image may then be fulfilled using the cached images. For example, rendering process 130, upon receiving a request 230 for a variation of the original image at resolution Z through portal 220, may check the cache to determine whether the variation has been previously rendered. If so, rendering process 130 may provide the previously rendered image to user 250. Cached rendered images may be stored in pyramid form, and requests for previously rendered images may be fulfilled by selecting the appropriate resolution from the cached image. Image caches may be kept in volatile memory or persistently stored. A caching algorithm may determine how long rendered images are kept in the cache.

Figure 3:
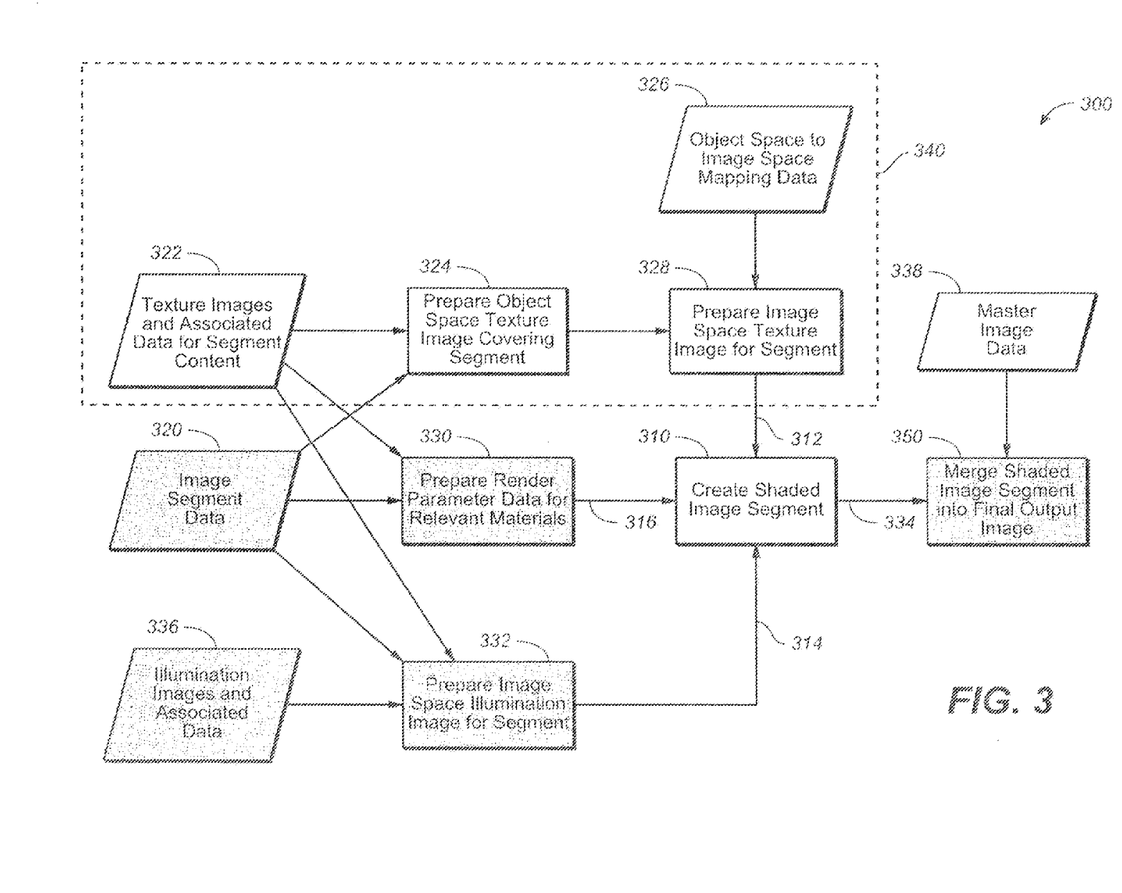
FIG. 3 illustrates an example render pipeline for re-texturing a segment of a digital image.

Rendering process 130 may consist of a number of distinct operations performed in sequence to form a render pipeline. An example render pipeline 300 is illustrated in FIG. 3. In example render pipeline 300, renderable objects are created as part of a master image authoring process and stored within an image vignette. A request for a rendered image may specify a subset of these renderable objects and may also specify data to use in rendering the image. Renderable objects permit segments of the rendered image to be re-textured, re-colored, or otherwise modified. For example, a request to render an image of a model wearing a particular style of jacket may specify that the jacket be displayed as brown leather instead of the gray canvas displayed in the original master image. Everything except for the jacket in the rendered image will be displayed as in the master image. In this example, a renderable data object may contain mask data describing which pixels in the image are associated with the jacket, another object may contain an illumination map capturing the naturally occurring shadows and highlights in the jacket region of the master image, and another object may contain a data model capturing the topography of the jacket region of the master image. Each active renderable object is processed in a predetermined order by the render pipeline in order to produce the requested image.

Processes in the render pipeline gather and prepare the input data 312, 314, and 316 for image shader process 310. The input to image shader process 310 may consist of two streams of data, one data stream 312 providing color data for each pixel in the image segment being processed and one data stream 314 providing illumination data for each pixel in the image segment being processed. In addition, a series of render parameters 316 may be provided as input to image shader process 310.

Color data 312 describes the appearance of the physical material, such as brown leather or green wool, requested for the image segment and may be in the form of an RGB value for each pixel contained in the segment. In some implementations, color data 312 is in the form of an RGB value plus an alpha value for each pixel in the segment. The RGB color model is an additive model in which red, green, and blue are combined in various ways to produce other colors. The alpha value is used to indicate the transparency of the color data. A color in the RGB color model can be described by indicating the relative amount of red, green, and blue color included. If R, G, and B are all at the minimum value, the resulting color is black. If R, G, and B are all at the maximum value, the resulting color is white. In some implementations, each of the R, G, B, and alpha components is specified as an unsigned 8-bit value encoded into a four-byte word for each pixel in the image segment.

Color data 312 may be generated when each pixel in image segment data 320 is mapped to a location within texture image 322 representing the physical material requested for the image segment. In some implementations, this mapping is a two stage process involving an intermediate coordinate space 324 together with a function or data 326 mapping this intermediate coordinate space 324 to the object image space 328 containing the pixels being rendered. An optional sharpening stage, not shown, may be applied near the end of this operation in order to restore any image sharpness which may be lost as part of the texture mapping process.

In addition to color data 312, each physical material has an associated set of render parameters 316, prepared by process 330, that control how the color data associated with the applied physical material should be combined with the segment illumination data 314, prepared by process 332, to produce the shaded output segment 334. In some implementations, the physical material type may vary within the segment being rendered, and the input data to image shader process 310 also includes a stream specifying the physical material type in the form of an index to be applied to each pixel. This index determines which render parameters will be employed for each pixel.

Illumination data 336 corresponds to the amount of light which is considered to fall on each pixel of the master image. Segment illumination data 314 corresponds to the amount of light which is considered to fall on each pixel of the image segment being processed and consists of a single unsigned 8 bit number for each pixel. The value of this number represents some general indication of the strength of the illumination falling on that pixel but does not specify either the precise intensity or the angular distribution of that illumination in terms of its diffuse or specular components.

The illumination data 314 is pre-processed to account for the overall surface reflectance of the underlying physical material as opposed to its color. This pre-processing allows different surface lusters to be modeled ranging from shiny to matte and can account for variations in these properties on a per pixel basis. Where appropriate, this variation is folded into the illumination map by means of a gloss map which forms part of the texture image of the applied data.

Example render pipeline 300 illustrates a re-texturing rendering process. In a re-coloring only rendering process, area 340 is simplified to a single data structure, not shown, which applies to all pixels of the image segment 320. The pipeline becomes more complicated when more sophisticated effects such as reflections are included.

After the processes in the render pipeline gather and prepare the input data 312, 314, and 316 for image shader process 310, image shader process 310 combines the material color data 312 with illumination data 314 to produce shaded output segment 334. To account for the visual effects associated with illuminating the physical material represented in the output segment, render parameters 316 provide image shader process 310 with pre-determined information to make heuristically-based adjustments to the color data in shaded output segment 334. Master image data 338 provides the portions of the image that were not modified, and these portions are combined with shaded output segment 334 in process 350 to produce a photorealistic rendered digital image.

Render parameters 316 may be comprised of one or more of an Intensity LUT, a Highlight LUT, a Shadow LUT, a Saturation LUT, a Specular LUT, and a contrast factor representing heuristic rules for combining color data 312 with illumination data 314. In some implementations, render parameters 316 may be comprised of other parameters representing heuristic rules for combining color data 312 with illumination data 314. When color data 312 is combined with illumination data 314 in accordance with these rules, the image produced by shaded output segment 334 appears to a human observer as if real materials were photographed under real illuminations. Render parameters 316 account for variations in visual effects produced when the same amount and orientation of light falls on different types of material. These effects may be difficult to accurately predict using a physics-based model. For example, the overall perceived output intensity may not vary linearly with illumination intensity, highlights may be perceived as brighter and shadows may be perceived as darker than might be predicted by a physics-based model, perceived saturation may vary with brightness, and output intensities above a certain threshold may be perceived as specular highlights.

The look-up tables and contrast factor are specific to a particular material and may be determined outside of the image rendering process by an external creation process. This creation process may be part of a software application configured to run on a computer or other data processing apparatus. In some implementations, this creation process is a workstation-based software application. After creating the look-up tables and contrast factor, the creation process may store them in a data storage device, making them available to an image rendering process. The data storage device may be volatile memory such as RAM, nonvolatile memory such as magnetic or optical disk, or any other suitable storage device. In some implementations, the data storage device is a remote storage device such as a data server.

Figure 4:
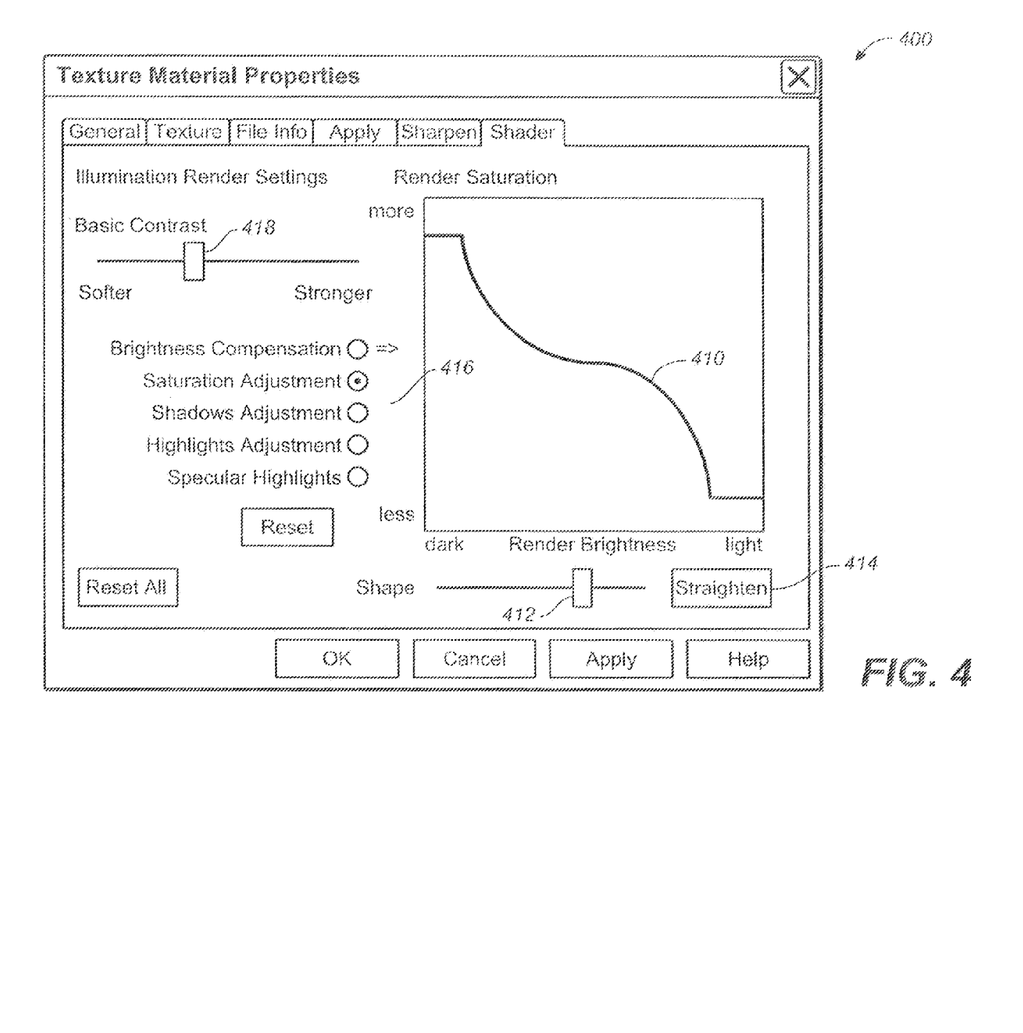
FIG. 4 is an example graphical user interface (GUI) for setting render parameters.

The render parameters 316 for a particular material may be set empirically using a graphical user interface (GUI) to the creation process. An example GUI 400 for setting the look-up tables and contrast factor is illustrated in FIG. 4. A user may set the basic contrast for the material using slider 418, moving the slider to the left for softer contrast and to the right for stronger contrast. A user may then select a look-up table using radio buttons 416 and then manipulate a parametric curve 410 using slider 412 and button 414 to define a monotonic function which maps an input value to an output value. This curve may then be converted to a look-up table. As the user manipulates the objects on the GUI, the image shader process renders an image using the new render parameters, providing "What You See Is What You Get" feedback to the user. When the user is satisfied with the output from the image shader process, the look-up tables and contrast factor may be saved.

Figure 5:
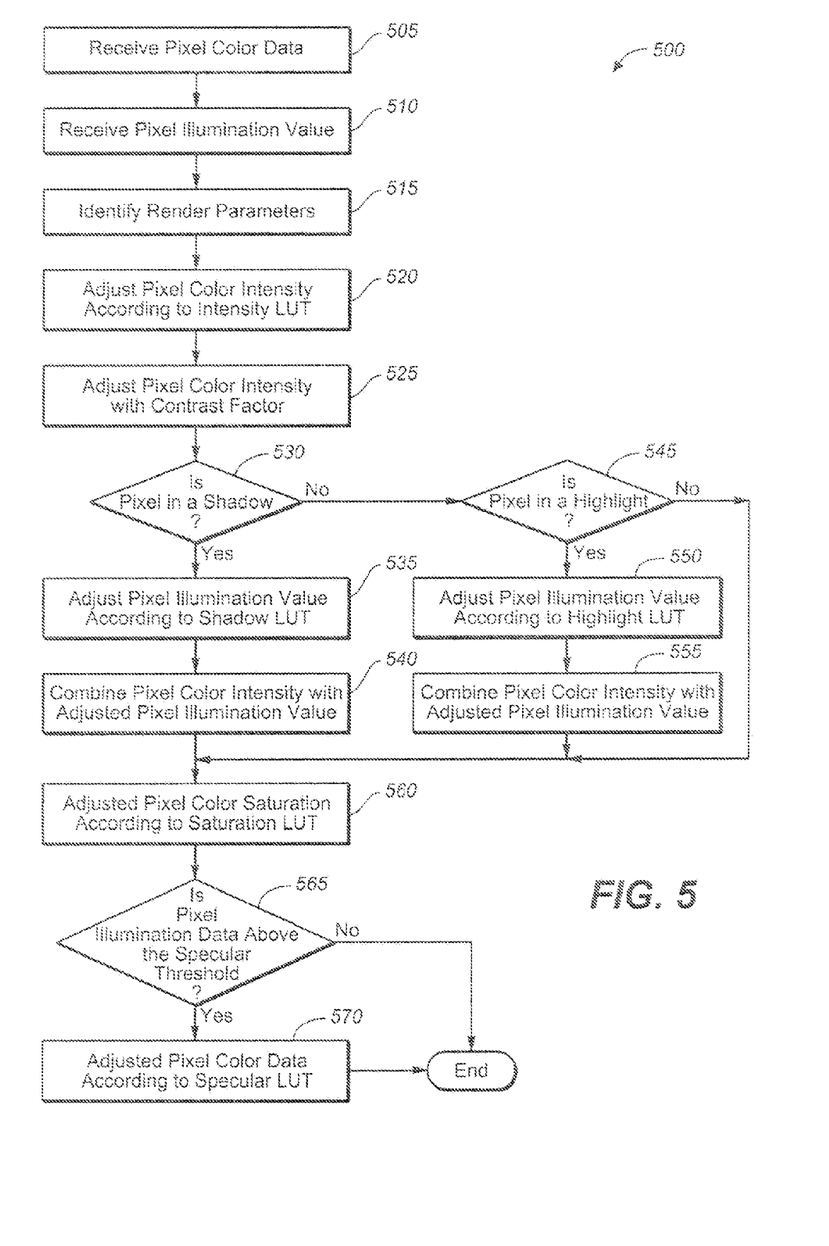
FIG. 5 is flowchart illustrating a method for combining color data with an illumination value in accordance with render parameters.

FIG. 5 is flowchart illustrating a method 500 for combining color data with an illumination value in accordance with render parameters. Method 500 may be used by image shader process 310 (shown in FIG. 3). To produce shaded output segment 334, method 500 may be performed for each pixel in the segment. At step 505, color data may be received. The color data represents one pixel from an image segment that is being modified by an image rendering process. For example, a user viewing an image of a model wearing a particular style of coat may wish to view the coat in a different color or fabric. The color data represents the new color or fabric. At step 510, an illumination value may be received. The illumination value relates to the same pixel in the segment as the color data, and may have been generated previously by an image authoring process performed on a master digital image. The illumination value represents the amount of light falling on the area of the image represented by the pixel. At step 515, render parameters specific to the requested variation of the master image may be identified. In example method 500, the render parameters include an Intensity LUT, a Highlight LUT, a Shadow LUT, a Saturation LUT, a Specular LUT, and a contrast factor representing heuristic rules for combining the color data with the illumination value. These render parameters are specific to the different color or fabric change requested by the user, and may have been determined empirically. In some implementations, one or more of these specific render parameters are used. In other implementations, different render parameters representing other heuristic rules for combining the color data with the illumination value are used.

In some implementations, the received color data is represented in RGB color space. In other implementations, the received color data is represented in HSI color space. In HSI color space, the color data is represented by values for Hue, Saturation, and Intensity instead of by values for Red, Green, and Blue. The relationship between RGB color space and HSI color space is well known. If the received color data is in RGB form, a conversion algorithm within the shader process may convert the color data to HSI form. In some implementations, the received color data is represented in an alternative color space and an appropriate conversion algorithm may convert the color data from the alternative color space to HSI form.

At step 520, the original Intensity value of the color data may be adjusted using the Intensity LUT to form a first interim Intensity value. The Intensity LUT maps an input Intensity value to an output Intensity value for the specific change requested by the user. At step 525, the first interim Intensity value determined by the Intensity LUT may be further adjusted using the contrast factor and the received illumination value to form a second interim Intensity value. A percentage of the second interim Intensity value may be calculated using an additive algorithm and the remainder of the second interim Intensity value may be calculated using a multiplicative algorithm. The additive algorithm adds the amount of the illumination value above the midpoint illumination value to the first interim Intensity value or subtracts the amount of the illumination value below the midpoint illumination value from the first interim Intensity value. The multiplicative algorithm multiplies the first interim Intensity value by the ratio of the illumination value to the midpoint illumination value.

For first interim Intensity values below the midpoint intensity value, the percentage of the second interim Intensity value calculated using the additive algorithm may correspond to the ratio of the contrast factor to the maximum contrast factor. For first interim Intensity values at or above the midpoint intensity value, the percentage of the second interim Intensity value calculated using the multiplicative algorithm may correspond to the ratio of the contrast factor to the maximum contrast factor. In other words, for lower first interim Intensity values, stronger contrast factors result in greater use of the additive algorithm in adjusting the intensity, while for higher first interim Intensity values, stronger contrast factors result in greater use of the multiplicative algorithm.

After calculating the second interim Intensity value at step 525, step 530 may determine whether the pixel being processed represents a shadow on the image segment. If the illumination value is below the midpoint illumination value, the pixel represents a shadow, and at step 535, the amount of the illumination value below the midpoint illumination value is adjusted using the Shadow LUT. The Shadow LUT maps the original Intensity value to an output Shadow intensity value. Then the amount of the illumination value below the midpoint illumination value is multiplied by the ratio of the amount of the output Shadow intensity value above the midpoint intensity value to the midpoint intensity value. This adjusted amount is then subtracted from the second interim Intensity value at 540 to form a final Intensity value.

If step 530 determines that the pixel is not a shadow, then step 545 may determine whether the pixel being processed represents a highlight on the image segment. If the illumination value is above the midpoint illumination value, the pixel represents a highlight, and at step 550, the amount of the illumination value above the midpoint illumination value is adjusted using the Highlight LUT. The Highlight LUT maps an input value determined by subtracting the Saturation value from the original Intensity value to an output Highlight intensity value. Then the amount of the illumination value above the midpoint illumination value is multiplied by the ratio of the amount of the output Highlight intensity value below the midpoint intensity value to the midpoint intensity value. This adjusted amount is then added to the second interim Intensity value at 555 to form a final Intensity value.

If step 545 determines that the pixel is not a highlight, then the pixel is neither a shadow nor a highlight and no adjustment may be required. In this case, the second interim Intensity value becomes the final Intensity value. In some implementations not illustrated in method 500, the pixel may always be categorized as either a highlight or a shadow.

After the final Intensity value is determined, the Saturation value may be adjusted at step 560 using the Saturation LUT. The Saturation LUT maps the amount of intensity change between the first interim Intensity value and the final Intensity value above the midpoint intensity value to a Saturation LUT output value. The Saturation value is then multiplied by the ratio of the Saturation LUT output value to the midpoint saturation value.

The Hue, Saturation, and Intensity values, as adjusted, may then be converted back to RGB color space. Step 565 then determines whether specular highlights should be added. In some implementations, specular highlights are added if the illumination value is equal to or above the midpoint illumination value. If specular highlights should not be added, method 500 is complete. If specular highlights should be added, then the Specular LUT maps the illumination value to an output value at 570. The output value is then added to each of the R, G, and B values, and method 500 is complete. After the heuristically-based adjustments represented by method 500 are performed for each pixel in the image segment, the segment may be combined with other adjusted segments and master image data to produce a photorealistic rendered digital image.

The preceding flowchart and accompanying description illustrates an example method 500. It will be understood that this method is for illustration purposes only and that the described or similar techniques may be performed at any appropriate time, including concurrently, individually, or in combination. In addition, many of the steps in this flowchart may take place simultaneously and/or in different orders than as shown. Moreover, a method may be used with additional steps, fewer steps, and/or different steps, so long as the method remains appropriate.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Some implementations may be well suited for an immersive or shared virtual reality environment in which a user or group of users may interact with the system in a natural way using head and body movement and in which the rendered images may be integrated into a synthetic three-dimensional world using appropriate hardware, providing a powerful collaborative design and review tool. Some implementations may be well suited for a retail environment in which, for example, untrained users may visit a kiosk to experiment with design ideas using touch-sensitive screens. Some implementations may form part of an interactive shop-window display allowing passers-by to access the system at any time, even when the associated business entity is closed.

What is claimed is:

1. A method comprising:
   receiving a request associated with rendering a digital image, the digital image comprising a photorealistic variation of a master digital image, the master digital image having an original resolution, wherein the request identifies a resolution that differs from the original resolution;
   selecting one of a plurality of digital image templates comprising image data associated with the master digital image, each of the plurality of digital image templates associated with a different, particular resolution and each of the plurality of digital image templates including a plurality of data items at the particular resolution, the selected digital image template comprising selected image data at a selected resolution different from the original resolution, wherein the selected image data includes at least a subset of the plurality of data items included in the selected digital image template;
   rendering the digital image using the selected digital image template by combining the selected image data; and
   providing the rendered digital image.

2. The method of claim 1, wherein rendering the digital image comprises:
   selecting color data associated with the request; and
   combining the selected color data with the selected image data.

3. The method of claim 2, wherein the photorealistic variation comprises a color change to the master digital image.

4. The method of claim 2, wherein the photorealistic variation comprises a texture change to the master digital image.

5. The method of claim 1, wherein the request is associated with a requested resolution and the selected resolution is equal to or greater than the requested resolution.

6. The method of claim 5, wherein the selected resolution is equal to the requested resolution.

7. The method of claim 1, wherein a single reference entity comprises the plurality of digital image templates.

8. The method of claim 7, wherein the single reference entity comprises a data file.

9. The method of claim 1, wherein a first digital image template is associated with the original resolution and a second digital image template is associated with one-half the original resolution.

10. The method of claim 1, wherein the selected image data comprises a texture map at the selected resolution, the texture map derived from the master digital image.

11. The method of claim 1, wherein the selected image data comprises an illumination map at the selected resolution, the illumination map derived from the master digital image.

12. The method of claim 1, wherein the rendering is performed on a server, the method further comprising:
   delivering the rendered image to a client in communication with the server.

13. The system of claim 1 wherein the plurality of data items for each digital image template include at least two data items selected from the group consisting of an illumination map, a texture map, one or more render parameters for combining color data with illumination data, and mask data identifying pixels associated with a predefined image segment.

14. A computer program product, encoded on a non-transitory computer-readable storage medium, operable to cause data processing apparatus to perform operations comprising:
   receiving a request for a digital image, the digital image comprising a photorealistic variation of a master digital image, the master digital image having an original resolution, wherein the request identifies a resolution that differs from the original resolution;
   selecting one of a plurality of digital image templates comprising image data associated with the master digital image, each of the plurality of digital image templates associated with a different, particular resolution and each of the plurality of digital image templates including a plurality of data items at the particular resolution, the selected digital image template comprising selected image data at a selected resolution different from the original resolution, wherein the selected image data includes at least a subset of the plurality of data items included in the selected digital image template; and
   combining the selected image data with color data associated with the request to form a rendered digital image.

15. The computer program product of claim 14, wherein the rendered digital image corresponds to the requested digital image, the operations further comprising providing the rendered digital image.

16. The computer program product of claim 14, wherein the request is associated with a requested resolution and the selected resolution is different from the requested resolution, the operations further comprising:
   scaling the rendered digital image to the requested resolution; and
   providing the scaled rendered digital image.

17. The computer program product of claim 14, wherein the combining is performed on a server, the operations further comprising delivering the rendered digital image to a client in communication with the server.

18. The computer program product of claim 14, wherein a single reference entity comprises the plurality of digital image templates.

19. The computer program product of claim 18, wherein a first digital image template is associated with a first resolution.

20. The computer program product of claim 19, wherein a second digital image template is associated with one-half the first resolution.

21. The computer program product of claim 20, wherein a third digital image template is associated with one-half the second resolution.

22. A system comprising:
   at least one data storage device; and
   one or more computers in communication with the at least one data storage device, the one or more computers operable to:
     access a first of a plurality of digital image templates located on the at least one data storage device, the digital image templates comprising image data associated with a master digital image, the master digital image having an original resolution, each digital image template associated with a different, particular resolution and each digital image template including a plurality of image data items at the particular resolution, the first digital image template comprising first image data at a first resolution; and render a digital image from the first image data and color data associated with a photorealistic variation of the master digital image, the rendered digital image corresponding to the photorealistic variation of the master digital image at a rendered resolution different from the master resolution.

23. The system of claim 22, wherein a single reference entity comprises the plurality of digital image templates.

24. The system of claim 22 further comprising a user interface device operable to interact with the one or more computers, the one or more computers further operable to display the rendered digital image through the user interface device.

25. The system of claim 22 further comprising a portal device, wherein the one or more computers are operable to communicate with an external processor through the portal device, the one or more computers further operable to:

receive, through the portal device, a request associated with rendering the photorealistic variation of the master digital image; and provide, through the portal device, the rendered digital image.

26. The system of claim 25, wherein the one or more computers comprise one or more servers and the portal device is configured to enable communication with one or more clients through a data communication network.

27. The system of claim 26, wherein the request is received from a client and the rendered digital image is provided to the client.

28. The system of claim 27, wherein the client comprises an image viewer application.

\* \* \* \* \*

UNITED STATES PATENT AND TRADEMARK OFFICE
CERTIFICATE OF CORRECTION

PATENT NO. : 8,019,182 B1  
APPLICATION NO. : 11/841460  
DATED : September 13, 2011  
INVENTOR(S) : Herbert Wolfram Page 1 of 1

It is certified that error appears in the above-identified patent and that said Letters Patent is hereby corrected as shown below:

In Column 16, Line 1, in Claim 13, delete "system" and insert --method--, therefor.

Signed and Sealed this
Fifteenth Day of November, 2011

David J. Kappos
*Director of the United States Patent and Trademark Office*